A. A. COLLINS.
SAFETY DEVICE FOR ELEVATORS.
APPLICATION FILED NOV. 6, 1912.
1,058,154.
Patented Apr. 8, 1913.
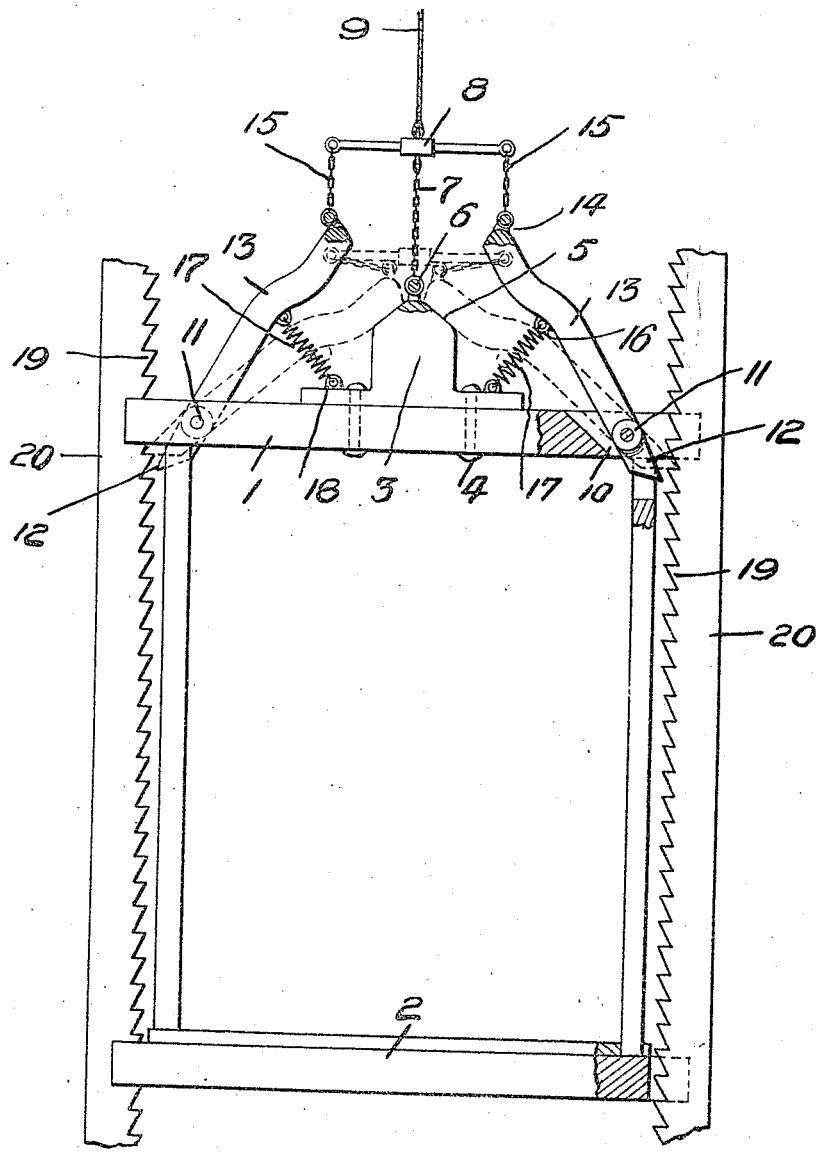
WITNESSES
INVENTOR
A. A. Collins.
ATTORNEYS

UNITED STATES PATENT OFFICE.

ARTHUR A. COLLINS, OF LARGE, PENNSYLVANIA.

SAFETY DEVICE FOR ELEVATORS.

1,058,154.          Specification of Letters Patent.      Patented Apr. 8, 1913.

Application filed November 6, 1912. Serial No. 729,867.

*To all whom it may concern:*

Be it known that I, ARTHUR A. COLLINS, a citizen of the United States of America, residing at Large, in the county of Allegheny and State of Pennsylvania, have invented certain new and useful Improvements in Safety Devices for Elevators, of which the following is a specification, reference being had therein to the accompanying drawing.

This invention relates to a safety device for elevators, and the primary object of my invention is to provide positive and reliable means, as hereinafter set forth, in connection with a cable hoisted cage for preventing the cage from falling or suddenly descending when the cable thereof breaks, thereby preventing the destruction of property and the loss of life due to such an accident.

A further object of this invention is to furnish the top of an elevator cage with pivoted spring actuated gripping arms that are released by a broken cable for gripping the guides or rails of the elevator cage, the arms when released being braced in engagement with the guides or rails whereby it is impossible for the cage to descend.

I attain the above objects by a strong, durable and inexpensive mechanism that will be hereinafter specifically described and then claimed, and reference will now be had to the drawing, wherein there is illustrated a front elevation of the cage, partly broken away and partly in section, showing the gripping mechanism in a normal position by full lines and in an abnormal position by dash lines.

To put my invention into practice I provide the top beam 1 of an elevator cage 2 with a centrally disposed inverted T-shaped head 3 that is riveted or otherwise connected to the beam 1, as at 4. The top of the shank of the head 3 has angularly disposed bracing surfaces 5 and a staple 6 to which is connected the lower end of a chain 7, said chain having the upper end thereof connected to a cross arm 8 supported by a hoisting cable 9. The ends of the beam 1 and the sides of the cage 2 are slotted, as at 10 and pivotally mounted in said slots by pins 11 are the outer toothed ends 12 of gripping members 13. The inner ends of the members are provided with staples 14 connected to the ends of the arm 8 by chains 15, or other flexible connections. The inner ends of the members 13 are also provided with staples 16 connected by coiled retractile springs 17 to staples 18, carried by the head 3. The toothed outer ends of the members 13 are adapted to engage the teeth or shoulders 19 of oppositely disposed vertical guides or frames 20 that guide the movement of the cage 2. When the hoisting cable 9 breaks the cross arm 8 is released and the springs 17 immediately shift the members 13 whereby the outer toothed ends thereof will engage the teeth or shoulders 19 of the guides 20 and the inner ends of said members rest upon the bracing surfaces 5 of the head 3. The inner ends of the members are then braced and the descent of the cage is impossible, under ordinary conditions, until the members 13 are moved or connected to the hoisting cable, as shown in the drawing.

The safety device in its entirety can be made of strong and durable material and is applicable to various types of cable hoisted elevators or cages.

What I claim is:—

In a safety device for elevators, the combination with guides having shoulders, a cage movable between said guides, and a hoisting cable for said cage, of an inverted T-shaped head secured to the top of said cage, a chain connected to the shank of the head, a cross arm attached to the chain and to said hoisting cable, gripping members inclined toward said shank and having their lower ends pivotally mounted in the sides of said cage at the top thereof and adapted to engage the shoulders of said guides, said members projecting above the shank of said head, vertically disposed chains connecting the ends of said cross arm to the upper ends of said members, and inclined springs having their upper ends connected to said members intermediate the ends of the latter and having their lower ends connected to the horizontal portion of said head.

In testimony whereof I affix my signature in the presence of two witnesses.

ARTHUR A. COLLINS.

Witnesses:
     JOHN W. COLLINS,
     MAX H. SROLOVITZ.